(12) United States Patent
Bunei

(10) Patent No.: US 11,816,723 B2
(45) Date of Patent: Nov. 14, 2023

(54) SALES OPERATIONS ASSISTANCE DEVICE, SALES OPERATIONS ASSISTANCE METHOD, AND SALES OPERATIONS ASSISTANCE NON-TRANSITORY COMPUTER READABLE MEDIUM

(71) Applicant: NEC Corporation, Tokyo (JP)

(72) Inventor: Mamoru Bunei, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/959,525

(22) PCT Filed: Dec. 25, 2018

(86) PCT No.: PCT/JP2018/047646
§ 371 (c)(1),
(2) Date: Jul. 1, 2020

(87) PCT Pub. No.: WO2019/135375
PCT Pub. Date: Jul. 11, 2019

(65) Prior Publication Data
US 2021/0065283 A1 Mar. 4, 2021

(30) Foreign Application Priority Data
Jan. 5, 2018 (JP) .................................. 2018-000611

(51) Int. Cl.
*G06Q 30/0601* (2023.01)
*G06Q 20/20* (2012.01)
*G06Q 20/32* (2012.01)

(52) U.S. Cl.
CPC ....... *G06Q 30/0639* (2013.01); *G06Q 20/208* (2013.01); *G06Q 20/322* (2013.01); *G06Q 30/0623* (2013.01)

(58) Field of Classification Search
CPC . G06Q 30/0601–0645; G06Q 30/0639; G06Q 30/0607; G06Q 30/0613;
(Continued)

(56) References Cited

U.S. PATENT DOCUMENTS

| 6,366,220 | B1 * | 4/2002 | Elliott | G06Q 10/087 340/5.1 |
| 2011/0082734 | A1 * | 4/2011 | Zhang | G06Q 10/087 705/28 |

(Continued)

FOREIGN PATENT DOCUMENTS

| JP | 2000-222478 A | 8/2000 |
| JP | 2010-061210 A | 3/2010 |

(Continued)

OTHER PUBLICATIONS

Rao, Leena. "eBay Acquires RedLaser To Integrate Barcode-Scanning Into iPhone Apps" (2010) TechCrunch.com (Year: 2010).*

(Continued)

*Primary Examiner* — Allison G Wood
*Assistant Examiner* — Katherine A Barlow
(74) *Attorney, Agent, or Firm* — Sughrue Mion, PLLC

(57) ABSTRACT

A sales operations assistance system (1) is configured including a store employee terminal (10) operated by a store employee and a medium (12). The medium (12) has a storage area that stores first information that indicates a type of a product. The store employee terminal (10) includes a communication unit (102) and a notification unit (104). The communication unit (102), by communicating with the medium (12), reads the first information stored in the storage area of the medium (12). The notification unit (104) acquires second information (additional information related to the product corresponding to the first information), using the first information read by the communication unit (102), and (Continued)

outputs the second information to a first output apparatus (1042) for use by the store employee.

19 Claims, 15 Drawing Sheets

(58) Field of Classification Search
CPC ........... G06Q 30/06–08; G06Q 10/187; G06Q 30/0603; G06Q 30/0633–0635; G06Q 30/0623; G06Q 30/0629; G06Q 30/0641; G06Q 10/087; G06Q 20/208
USPC ................................................ 705/26.1–27.2
See application file for complete search history.

(56) References Cited

U.S. PATENT DOCUMENTS

| | | | | |
|---|---|---|---|---|
| 2011/0231331 | A1* | 9/2011 | Smith | G06Q 30/0281 |
| | | | | 186/59 |
| 2014/0003727 | A1* | 1/2014 | Lortz | G06Q 30/0633 |
| | | | | 382/218 |
| 2014/0156459 | A1* | 6/2014 | Zises | G06Q 30/0643 |
| | | | | 705/26.61 |
| 2014/0258028 | A1* | 9/2014 | Bynum | G01C 21/3484 |
| | | | | 705/26.8 |
| 2014/0279221 | A1* | 9/2014 | Woodward | G06Q 30/0607 |
| | | | | 705/26.25 |
| 2014/0279269 | A1* | 9/2014 | Brantley | G06Q 30/0635 |
| | | | | 705/26.81 |
| 2015/0356657 | A1* | 12/2015 | Pas | G06Q 30/0629 |
| | | | | 705/26.64 |
| 2017/0006027 | A1* | 1/2017 | Hagiwara | G06F 16/9554 |
| 2017/0039627 | A1* | 2/2017 | Kalvin | G06Q 30/0643 |
| 2017/0061525 | A1* | 3/2017 | McCoy | G06Q 30/0639 |
| 2017/0228816 | A1* | 8/2017 | Joppi | G06Q 10/087 |
| 2017/0270502 | A1* | 9/2017 | Finbow | G06Q 30/06 |
| 2018/0293593 | A1* | 10/2018 | De Bruijn | H04B 10/116 |
| 2018/0293831 | A1 | 10/2018 | Takeuchi et al. | |

FOREIGN PATENT DOCUMENTS

| | | |
|---|---|---|
| JP | 2014-029643 A | 2/2014 |
| JP | 2015-212958 A | 11/2015 |
| JP | 2018-000611 A | 1/2018 |
| WO | 2017/104004 A1 | 6/2017 |

OTHER PUBLICATIONS

Sterling, Greg. "Walmart Brings Product Search to the In-Store Experience." SearchEngineLand.com (Year: 2014).*
Keehan, Eileen. "There's More to Electronic Shelf Labels than Pricing" SDCExec.com (Year: 2015).*
Lamonica, Mark. "Philips Creates Shopping Assistant with LEDs and Smart Phone" IEEE Spectrum. spectrum.IEEE.org (Year: 2014).*
Geller, Martinne. "Special Report: When it comes to e-cigs, Big Tobacco is concerned for your health" Reuters.com. (Year: 2015).*
Extended European Search Report for EP Application No. EP18898671.5 dated Nov. 19, 2020.
International Search Report for PCT Application No. PCT/JP2018/047646, dated Mar. 12, 2019.

* cited by examiner

SALES OPERATIONS ASSISTANCE DEVICE, SALES OPERATIONS ASSISTANCE METHOD, AND SALES OPERATIONS ASSISTANCE NON-TRANSITORY COMPUTER READABLE MEDIUM

This application is a National Stage Entry of PCT/JP2018/047646 filed on Dec. 25, 2018, which claims priority from Japanese Patent Application 2018-000611 filed on Jan. 5, 2018, the contents of all of which are incorporated herein by reference, in their entirety.

TECHNICAL FIELD

The disclosure relates to a technique for assisting sales operations.

BACKGROUND ART

There is a case where, when a customer purchases a product, the customer informs a store employee of a desired product, and the store employee takes the product out of a back room or the like and hands the product to the customer. In general, a large number of products are sold in a store, and a lineup and arrangement of products sold in the store may vary according to seasons, a plan of the store, and the like. Thus, it sometimes takes a long time for a store employee to find a product that a customer desires to purchase.

Examples of a technique for finding a desired product are disclosed in, for example, PTLs 1 and 2 described below. In PTL 1 described below, a technique is disclosed in which product information of a product that a customer desires to purchase is recorded in an information recording medium, such as a membership card of the customer, in advance, and a control apparatus reads the product information recorded in the information recording medium and, based on the read product information, specifies and displays a display place of the product. In PTL 2 described below, a technique is disclosed in which, by use of product information of a product selected by a customer on a product selection screen, location information of the selected product in a store front housing rack, which houses various types of products, is specified and, by causing a light emitting element corresponding to the location information to emit light, the location of the product is notified.

In PTL 3 described below, a technique is disclosed in which information of a recommended product that resembles a product selected by a user on a terminal is acquired and the acquired information is provided to a user in conjunction with information of a display place and a price of the recommended product.

CITATION LIST

Patent Literature

[PTL 1] Japanese Patent Application Publication No. 2000-222478
[PTL 2] Japanese Patent Application Publication No. 2010-061210
[PTL 3] Japanese Patent Application Publication No. 2014-029643

SUMMARY OF INVENTION

Technical Problem

The technique in PTL 1 described above is a technique for notifying a customer, not a technique for notifying a store employee. In the technique in PTL 2 described above, a customer is required to look for a desired product from the product selection screen. When a large number of types of products are sold in the store, convenience for a customer is further reduced. When a product that a customer desires to purchase is not sold in the store, the customer cannot find out that the product is not sold in the store unless the customer checks the entire product information in the product selection screen.

The disclosure is made in consideration of the above-described problems. An object of the disclosure is to provide a technique capable of achieving both labor saving in the operation performed by a store employee and improvement in convenience for a customer at the same time.

Solution to Problem

According to the Disclosure,
a sales operations assistance system including:
a medium that has a storage area that stores first information that indicates a type of a product; and a store employee terminal that a store employee operates, in which the store employee terminal includes
a communication unit that reads, by communicating with the medium, the first information stored in the storage area, and
a notification unit that acquires second information of the product, using the first information read by the communication unit, and outputs the second information to a first output apparatus for use by the store employee is provided.

According to the Disclosure,
a sales operations assistance method performed by a computer, the method including
by communicating with a medium having a storage area that stores first information indicating a type of a product, reading the first information stored in the storage area; and
acquiring second information of the product, using the read first information, and outputting the second information to a first output apparatus for use by a store employee is provided.

According to the Disclosure,
a program causing a computer to execute the above-described sales operations assistance method is provided.

Advantageous Effects of Invention

The disclosure enables both labor saving in the operation performed by a store employee and improvement in convenience for a customer to be achieved at the same time.

BRIEF DESCRIPTION OF DRAWINGS

The above-described object and other objects, features, and advantages will be more apparent by the preferred example embodiments described below and the following drawings accompanying therewith.

EXAMPLE EMBODIMENT

[Outline Description]

First, the disclosure will be broadly described. A sales operations assistance system according to the disclosure is configured including a medium and a store employee terminal. The store employee terminal is a terminal that a store employee operates. The store employee terminal is installed at, for example, a checkout counter of a store. The medium has a storage area into which any information can be stored. In the storage area of each medium, information (hereinafter, also referred to as "first information") that indicates a type of a product corresponding to the medium is stored. The media are, for example, sold to customers at a store front. The media may be lent or provided without charge to customers by the store. Each customer obtains a medium storing first information of a desired product, such as a product that the customer frequently purchases. By causing the store employee terminal to read the obtained medium in place of verbally communicating the type or the like of the product to a store employee, the customer can receive a service using the medium. Although details will be described later, the store employee terminal specifies a product corresponding to the medium, based on first information stored in the storage area of the medium. The store employee terminal acquires information (hereinafter, also referred to as "second information") relevant to the specified product. The store employee terminal notifies the store employee of the acquired second information.

Hereinafter, example embodiments of the disclosure will be described using the drawings. In all the drawings, the same signs are assigned to the same constituent elements, and a description thereof will not be repeated. Unless specifically described, in block diagrams, each block represents a component as a functional unit instead of a hardware unit.

First Example Embodiment (System Configuration)

Figure 1:
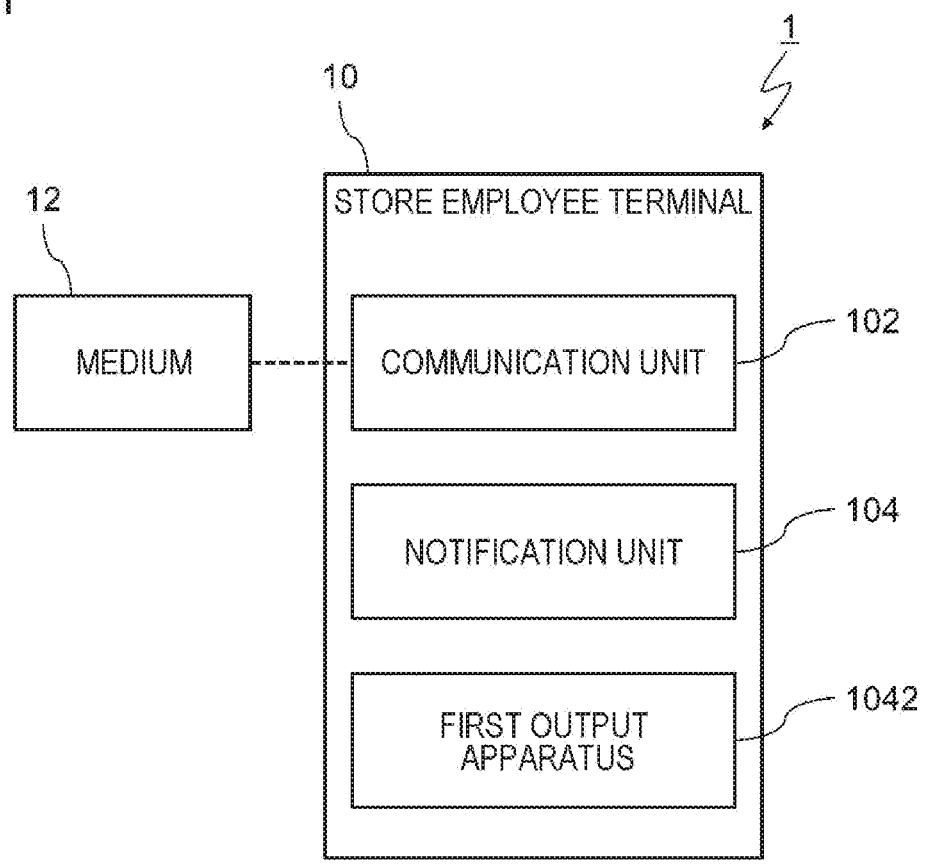
FIG. 1 is a block diagram conceptually illustrating a configuration of a sales operations assistance system in a first example embodiment.

FIG. 1 is a block diagram conceptually illustrating a configuration of a sales operations assistance system in a first example embodiment. As illustrated in FIG. 1, a sales operations assistance system 1 is configured including a store employee terminal 10 and a medium 12.

The medium 12 has a storage area that stores first information. The first information stored in the medium 12 includes at least information indicating a type of a product. As an example, the first information stored in the storage area of the medium 12 is product identification information for identifying each product. As another example, the first information stored in the storage area of the medium 12 may be information that is common (invariable) to a plurality of different stores as "information indicating a type of a product", such as a unique name of the product. Storing information common to a plurality of stores as described above in a medium 12 enables a customer possessing the medium 12 to receive a service using the medium 12 at a plurality of different stores.

The medium 12 is, for example, a radio frequency identification (RFID) tag. It should be noted that, the shape of the medium 12 is not particularly limited. For example, the shape of the medium 12 may be a card type or a coin type. The medium 12 may be configured to be attachable to any object. For example, the medium 12 may have a surface (hereinafter, also referred to as an "adhesive surface") to at least a portion of which an adhesive agent is applied. In this case, the medium 12 is attached to a possession of a customer, such as a lighter and a card, by the adhesive surface. The medium 12 may have a surface (hereinafter, also referred to as an "identification surface") a portion of which includes information for identifying a product corresponding to the medium 12. For example, the medium 12 may have a surface on which the name of a product is printed or a surface on which a package image of a product is drawn as the above-described identification surface. It should be noted that, when the medium 12 has an adhesive surface, the identification surface is preferably provided on a surface other than the adhesive surface. The medium 12 having an identification surface enables the customer to easily recognize a medium 12 corresponding to a desired product.

The store employee terminal 10 is a terminal operated by a store employee. The store employee terminal 10 is installed at, for example, a checkout counter of a store. As illustrated in FIG. 1, the store employee terminal 10 includes a communication unit 102 and a notification unit 104. The communication unit 102 communicates with the above-described medium 12 and thereby reads first information stored in the storage area of the medium 12. The notification unit 104, using first information read by the communication unit 102, acquires additional information (second information) relevant to the product indicated by the first information. The second information is, for example, stored in the store employee terminal 10 or an external apparatus that can communicate with the store employee terminal 10 in association with the first information stored in the medium 12. The second information includes at least information informing a store employee of a product that the customer desires to purchase and/or a location where the product is located. As a specific example, the second information is, for example, the name of the product, information indicating a display place of the product, and the like. The information indicating a display place of the product may be, for example, information like a map illustrating the display place of the product or information like a number (a consecutive number or a number like A-2 that means the second column on the shelf A) that is assigned to each display location of a product. The second information may further include other information, such as information on a price of the product and benefits (for example, a discount or a price reduction) applied to the product. The notification unit 104 outputs the second information acquired based on the first information read from a medium 12 to an output apparatus 1042 (hereinafter, referred to as a "first output apparatus") for use by a store employee.

(Hardware Configuration)

The functional constituent units of the above-described store employee terminal 10 may be achieved by hardware (for example, hardwired electronic circuits) that achieves the functional constituent units or achieved by a combination of hardware and software (for example, a combination of an electronic circuit and a program controlling the electronic circuit). Hereinafter, a case where the functional constituent units of the store employee terminal 10 are achieved by a combination of hardware and software will be further described.

Figure 2:
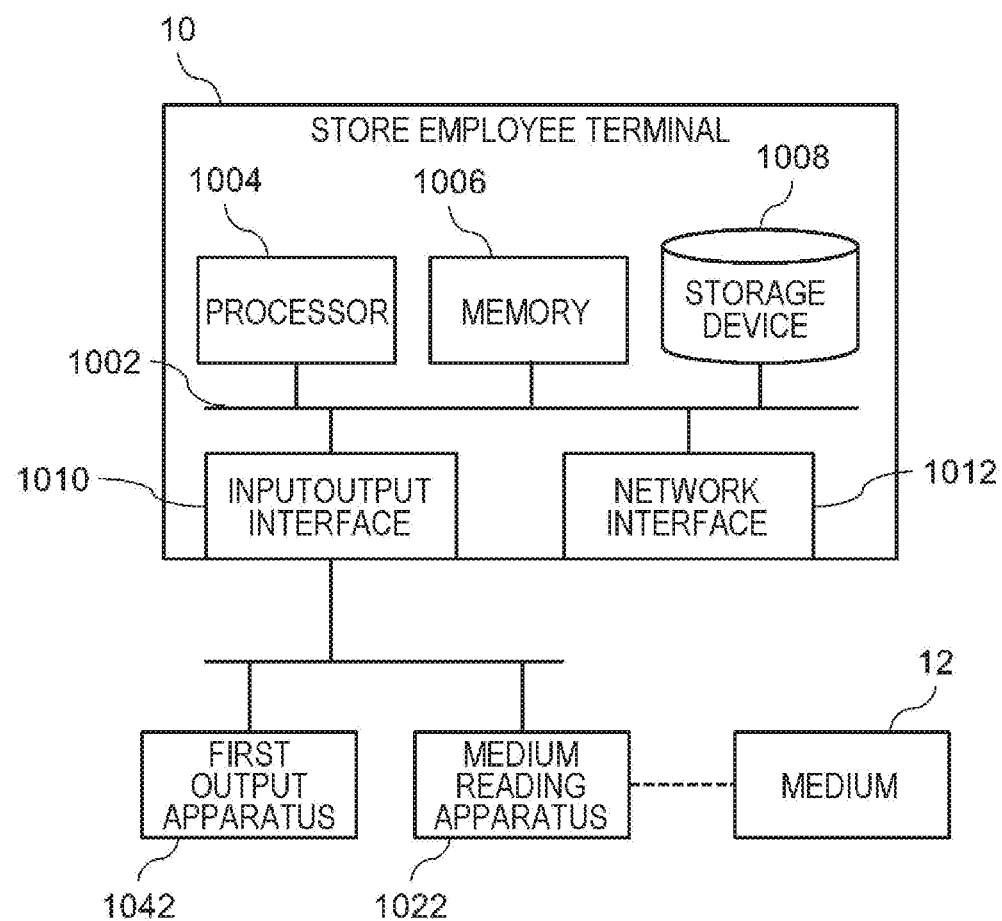
FIG. 2 is a block diagram illustrating a hardware configuration of a store employee terminal in a sales operations assistance system of a first example embodiment.

FIG. 2 is a block diagram illustrating a hardware configuration of the store employee terminal 10 in the sales operations assistance system 1 of the first example embodiment. The store employee terminal 10 includes a bus 1002, a processor 1004, a memory 1006, a storage device 1008, an input/output interface 1010, and a network interface 1012.

The bus 1002 is a data transmission line through which the processor 1004, the memory 1006, the storage device 1008, the input/output interface 1010, and the network interface 1012 transmit and receive data to and from one another. However, a method for connecting the processor 1004 and the like is not limited to the bus connection.

The processor 1004 is a processor achieved by a central processing unit (CPU), a graphics processing unit (GPU), or the like.

The memory 1006 is a main storage achieved by a random access memory (RAM) or the like.

The storage device 1008 is an auxiliary storage achieved by a hard disk drive (HDD), a solid state drive (SSD), a memory card, a read only memory (ROM), or the like. The storage device 1008 stores program modules that achieve the functions (the communication unit 102, the notification unit 104, and the like) of the store employee terminal 10. The processor 1004 reading and executing the program modules in the memory 1006 causes the functions corresponding to the program modules to be achieved.

The input/output interface 1010 is an interface for connecting the store employee terminal 10 and various types of input/output devices to each other. In the example in FIGS. 2, to the input/output interface 1010, the first output apparatus 1042 and a medium reading apparatus 1022 are connected. The medium reading apparatus 1022 is an apparatus that reads first information stored in the storage area of a medium 12. The medium reading apparatus 1022 supports, for example, various types of wireless communication standards and is configured to read first information stored in a medium 12 by means of wireless communication with the medium 12. The medium reading apparatus 1022 may be equipped with a camera and configured to read information on the identification surface of a medium 12, using an image recognition technology. The first output apparatus 1042 is an apparatus, such as a display and a speaker, that outputs information to a store employee.

The network interface 1012 is an interface for connecting the store employee terminal 10 to a network. The network is, for example, a local area network (LAN) or a wide area network (WAN). A method by which the network interface 1012 connects to a network may be wireless connection or wired connection.

It should be noted that, the hardware configuration of the store employee terminal 10 is not limited to the configuration illustrated in FIG. 2. For example, in addition to the medium reading apparatus 1022 and the first output apparatus 1042, another apparatus that is used in the business of the store may be connected to the input/output interface 1010. Examples of the another apparatus that is used in the business of the store include, for example, an input apparatus, such as a mouse and a keyboard, a display that displays business screens, a touch panel into which an input apparatus and a display are integrated, a scanning apparatus for product recognition, a cash register, a drawer, and an automatic change dispenser.

Operation Example

Figure 3:
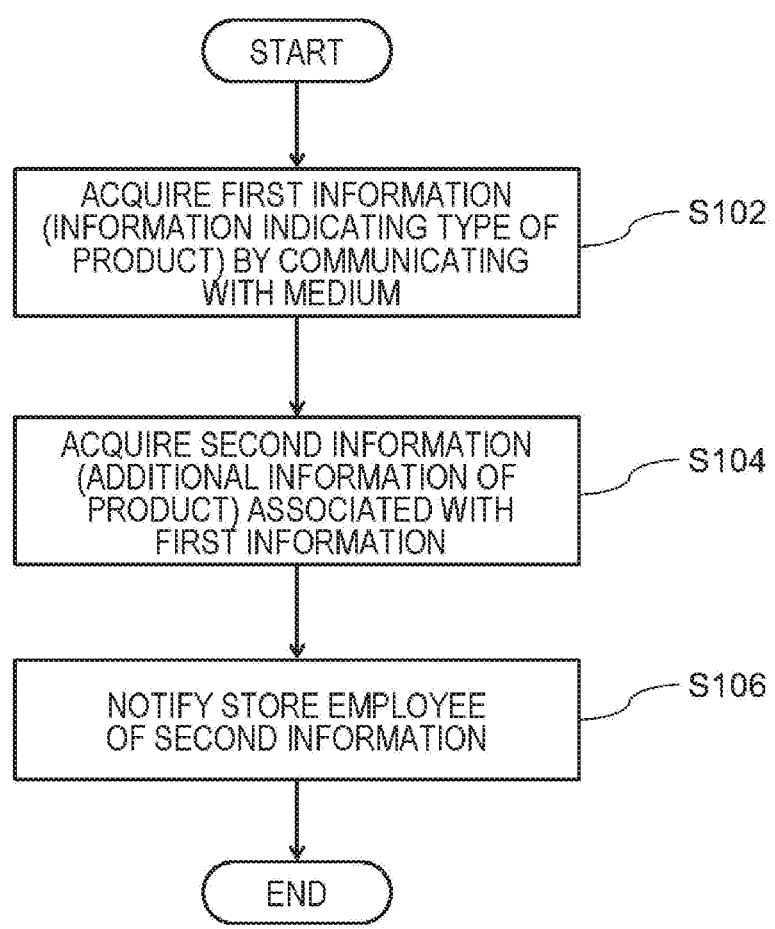
FIG. 3 is a flowchart illustrating a processing flow in the sales operations assistance system according to the first example embodiment.

Using FIG. 3, a processing flow of the sales operations assistance system 1 of the present example embodiment will be described. FIG. 3 is a flowchart illustrating a processing flow in the sales operations assistance system 1 according to the first example embodiment.

First, the communication unit 102 acquires first information (information indicating a type of a product) stored in the storage area of a medium 12 (S102). Specifically, when a customer or a store employee who has received the medium 12 from the customer holds the medium 12 over the medium reading apparatus 1022 connected to the store employee terminal 10, first information stored in the medium 12 is read by the medium reading apparatus 1022. The communication unit 102 acquires the first information read by the medium reading apparatus 1022 and stores the first information in, for example, the memory 1006.

Subsequently, the notification unit 104, using the first information stored in the memory 1006 or the like by the communication unit 102, acquires second information (additional information of the product corresponding to the medium 12) (S104). As an example, the second information of the product is stored in the storage device 1008 in association with the first information stored in the medium 12. In this case, the notification unit 104 is capable of reading the second information, which is associated with the first information acquired in the processing in S102, from the storage device 1008.

Subsequently, the notification unit 104 notifies the store employee of the second information acquired in the processing in S104 via the first output apparatus 1042 (S106). As an example, when the first output apparatus 1042 is a display installed for store employees, the notification unit 104 generates drawing data of a screen including the second information acquired in the processing in S104 and outputs the drawing data to the display. In this case, the display installed as the first output apparatus 1042 displays a screen including the second information, based on the drawing data acquired from the notification unit 104. The store employee is able to know the second information of the product corresponding to the medium 12 by checking displayed contents on the display. As another example, when the first output apparatus 1042 is a speaker apparatus installed for store employees, the notification unit 104 converts the second information acquired in the processing in S104 to voice data, using, for example, a known voice synthesis technology and outputs the voice data to the speaker apparatus. The speaker apparatus reproduces a voice conveying the second information of the product, based on the voice data acquired from the notification unit 104. The store employee is able to know the second information of the product corresponding to the medium 12, based on the voice reproduced from the speaker apparatus.

Consequently, in the present example embodiment, based on first information indicating a type of a product that is stored in a medium 12, additional information (second information) of the product is acquired. The second information of the product is notified to a store employee via, for example, the first output apparatus 1042. This configuration enables a store employee to easily and accurately know information on a product that a customer desires to purchase. It is possible for a customer to inform a store employee of a product that the customer desires to purchase by means of a simple action of presenting a medium 12. In other words, both labor saving in the operation performed by store employees and improvement in convenience for customers can be achieved at the same time. The present example embodiment enables the possibility of occurrence of miscommunication between a customer and a store employee to be reduced.

Second Example Embodiment

The present example embodiment differs from the above-described first example embodiment in further including a processing unit that writes first information in a storage area of a medium 12.
(System Configuration)

Figure 4:
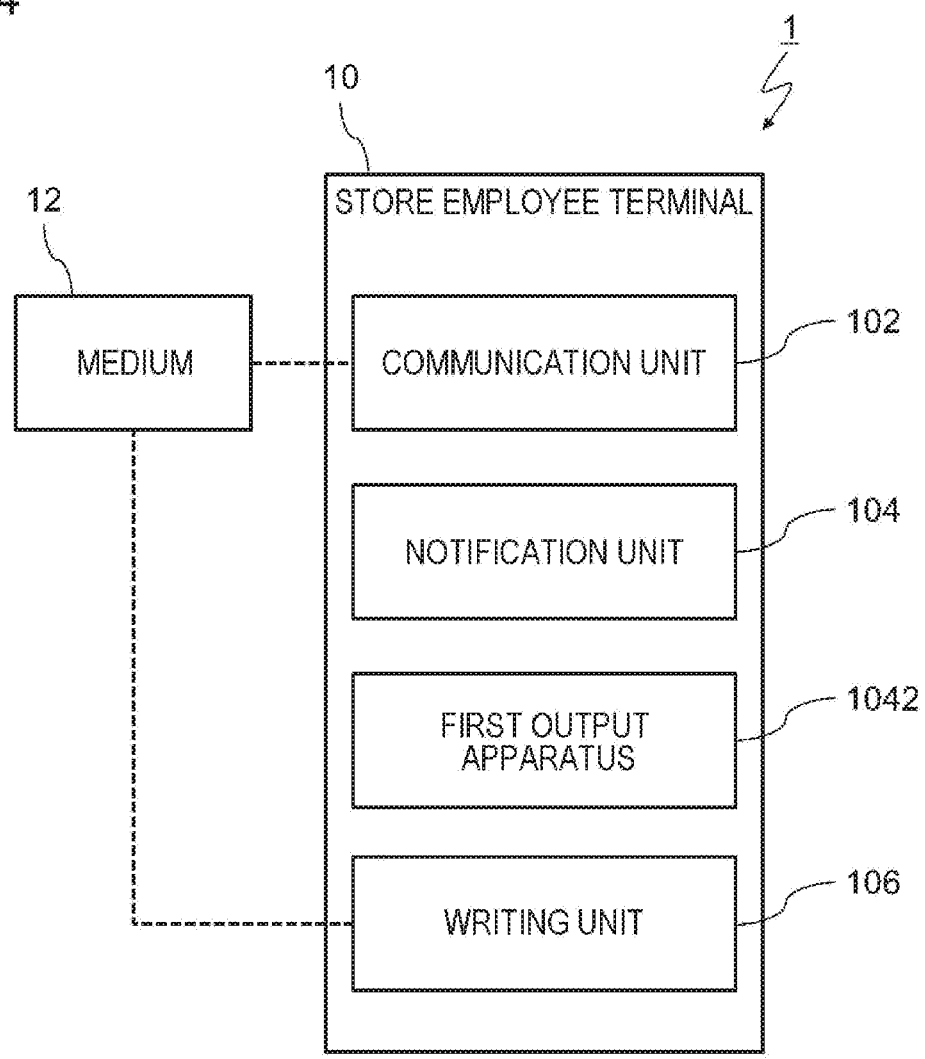
FIG. 4 is a diagram conceptually illustrating a configuration of a sales operations assistance system according to a second example embodiment.

FIG. 4 is a diagram conceptually illustrating a configuration of a sales operations assistance system 1 according to a second example embodiment. As illustrated in FIG. 4, in the sales operations assistance system 1 of the present example embodiment, a store employee terminal 10 further includes a writing unit 106.

When a medium 12 is provided to a customer, the writing unit 106 writes first information in the storage area of the medium 12. The writing unit 106 may be configured to write the first information in the medium 12 in such a manner that the first information cannot be rewritten subsequently. As an example, the writing unit 106 may be configured to write flag information indicating that the first information cannot be rewritten subsequently, at the same time as writing the first information. In this case, the writing unit 106 is capable of, by confirming presence or absence of flag information before performing processing of writing the first information in the medium 12, determining whether the first information can be written in the medium 12. As another example, as a mechanism for writing information in the storage area of a medium 12, a mechanism preventing rewriting may be employed. Specific examples of the mechanism include a mechanism in which information is written by irreversibly changing a material used as the storage area of a medium 12 through thermal reaction, photochemical reaction, or the like. In this case, once the writing unit 106 writes first information in the storage area of a medium 12, it subsequently becomes impossible to rewrite the first information in the storage area of the medium 12. Such a configuration enables first information stored in a medium 12 to be prevented from being mistakenly rewritten subsequently.

(Hardware Configuration)

Figure 5:
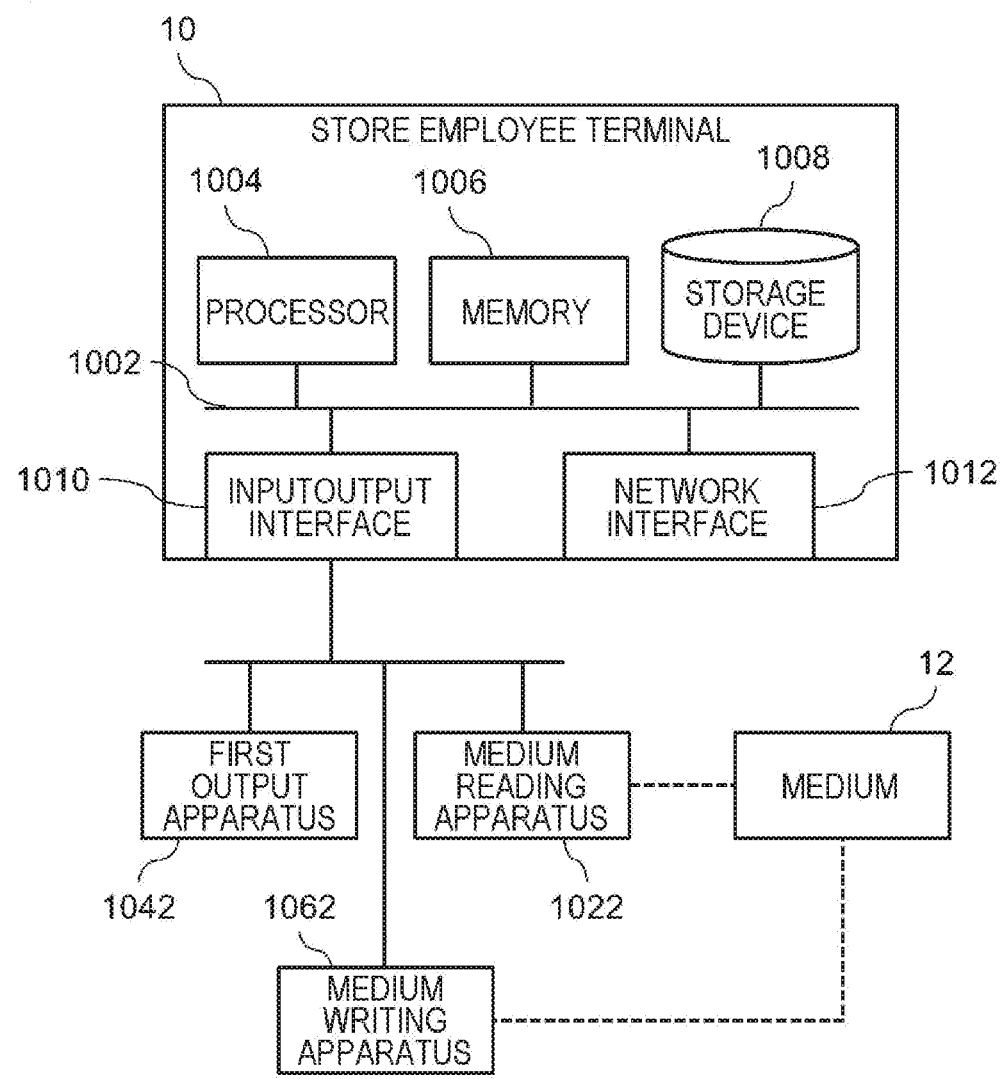
FIG. 5 is a block diagram illustrating a hardware configuration of a store employee terminal in the sales operations assistance system of the second example embodiment.

FIG. 5 is a block diagram illustrating a hardware configuration of the store employee terminal 10 in the sales operations assistance system 1 of the second example embodiment. In the present example embodiment, the store employee terminal 10 includes a medium writing apparatus 1062 in addition to the configuration of the first example embodiment. The medium writing apparatus 1062 supports various types of wireless communication standards and is configured to write any information in the storage area of a medium 12 by means of wireless communication with the medium 12. It should be noted that, the medium writing apparatus 1062 and a medium reading apparatus 1022 may be an integrated apparatus (reader/writer apparatus). A storage device 1008 of the present example embodiment further includes program modules for achieving functions of the writing unit 106. The processor 1004 reading and executing the program modules in a memory 1006 causes the operation of the medium writing apparatus 1062 to be controlled and the above-described functions of the writing unit 106 to be achieved.

Operation Example

Figure 6:
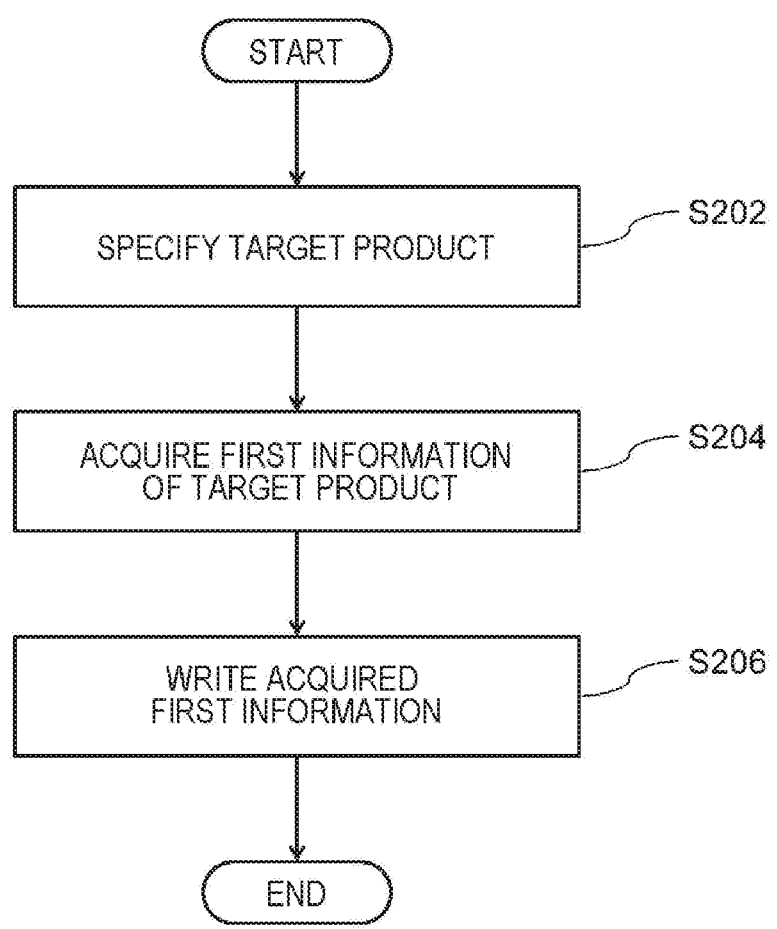
FIG. 6 is a flowchart illustrating a processing flow in which a writing unit writes first information in a medium.

Using FIG. 6, a processing flow of the sales operations assistance system 1 of the present example embodiment will be described. FIG. 6 is a flowchart illustrating a processing flow in which the writing unit 106 writes first information in a medium 12.

First, the writing unit 106 specifies a target product (S202). As an example, the writing unit 106 can specify a target product, based on a product identification label (for example, a bar-code) that a store employee caused the store employee terminal 10 to read. In this case, the store employee may cause the store employee terminal 10 to read a product identification label stuck on the package of the product. The store employee may also select the product identification label of the target product from among the individual product identification labels of a plurality of products printed on a paper medium in a list form and cause the store employee terminal 10 to read the selected product identification label. In place of the product identification label, an image of the product (for example, a package image including a product name) generated by a not-illustrated image capturing device may be used. In this case, the writing unit 106 can specify the target product, based on an analysis result of the image of the product. A screen for selection of a product may be displayed on a display for use by a store employee or a customer, and the store employee or the customer may be allowed to select a product on the screen. In this case, the writing unit 106 can specify the target product, based on a selection result on the screen.

The writing unit 106 reads first information corresponding to the product specified in the processing in S202 (S204). The writing unit 106 may acquire the product identification information, the unique name, or the like of the product specified in S202 as first information. Such first information is stored in, for example, the storage device 1008 in advance. The writing unit 106 writes the first information acquired in the processing in S204 in the storage area of the medium 12, using the medium writing apparatus 1062 (S206). On this occasion, the writing unit 106 may write flag information indicating that the first information cannot be rewritten subsequently, in the storage area of the medium 12 at the same time.

In the present example embodiment, when a medium 12 is provided to a customer, a product that the customer desires to purchase is confirmed and first information of the product is written in the medium 12. Such a configuration makes it unnecessary to manage media 12 with respect to all products sold in a store and thereby enables management cost on the store side to be reduced.

Third Example Embodiment

Figure 7:
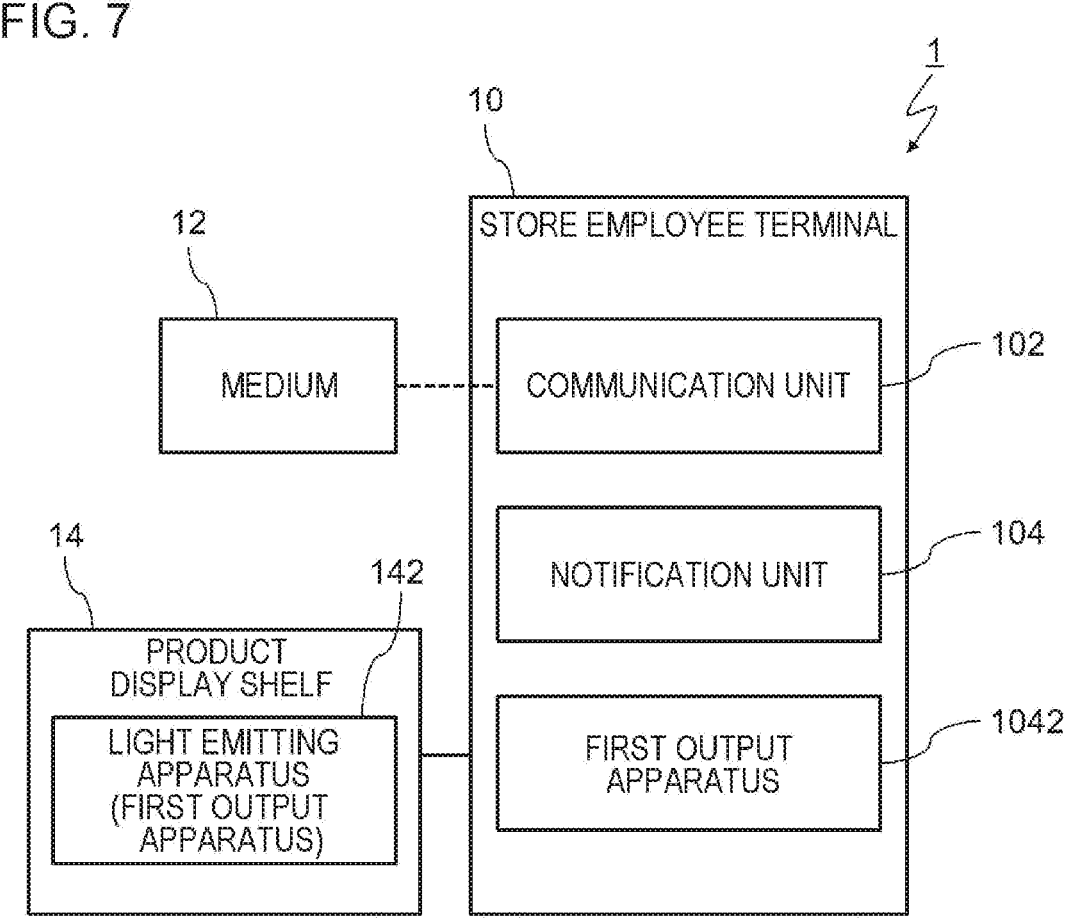
FIG. 7 is a diagram conceptually illustrating a configuration of a sales operations assistance system according to a third example embodiment.

The present example embodiment is the same as the above-described example embodiments except the following differences.
(System Configuration)
FIG. 7 is a diagram conceptually illustrating a configuration of a sales operations assistance system 1 according to a third example embodiment. As illustrated in FIG. 7, in the present example embodiment, the sales operations assistance system 1 further include a product display shelf 14. It should be noted that, in FIG. 7, an example in which the sales operations assistance system 1 is configured based on the configuration of the first example embodiment is illustrated. The sales operations assistance system 1 of the present example embodiment may further include the configuration described in the second example embodiment.

The product display shelf 14 is installed in a store employee-only area. Although not particularly limited, the store employee-only area is, for example, the inner side of the checkout counter or a back room of the store. The product display shelf 14 has a space in which a plurality of products are displayed. In the product display shelf 14, light emitting apparatuses 142 are disposed. A light emitting apparatus 142 is disposed with respect to each product (at each display place for a product). The product display shelf 14 or the light emitting apparatuses 142 disposed in the product display shelf 14 are connected to a store employee terminal 10 in a communicable manner. Light emitting operations of the light emitting apparatuses 142 are, for example, controlled by instructions from a notification unit 104, as will be described later.

In the present example embodiment, the notification unit 104 acquires, based on first information indicating a type of a product that is stored in a medium 12, second information including information indicating a display place (hereinafter, also referred to as "display place information") of the product. In this case, the notification unit 104 is capable of outputting the acquired information indicating a display place of the product to a first output apparatus 1042. The information indicating a display place of a product is, for example, a map illustrating a display location of the target product in the product display shelf 14 or a number assigned to the product display shelf 14. In the present example embodiment, the notification unit 104 is capable of causing, based on the acquired display place of the product, a light emitting apparatus 142 corresponding to the display place of the product to emit light. The notification unit 104 specifies a light emitting apparatus 142 corresponding to the display place of the product from among the plurality of light emitting apparatuses 142 disposed in the product display shelf 14. The notification unit 104 outputs an instruction to start a light-emitting action to the specified light emitting apparatus 142. In response to the instruction, the light emitting apparatus 142 emits light. It should be noted that, in this case, the light emitting apparatuses 142 can be said to be an output apparatus (that is, a "first output apparatus") for use by a store employee that outputs second information acquired based on first information read from a medium 12.

Figure 8:
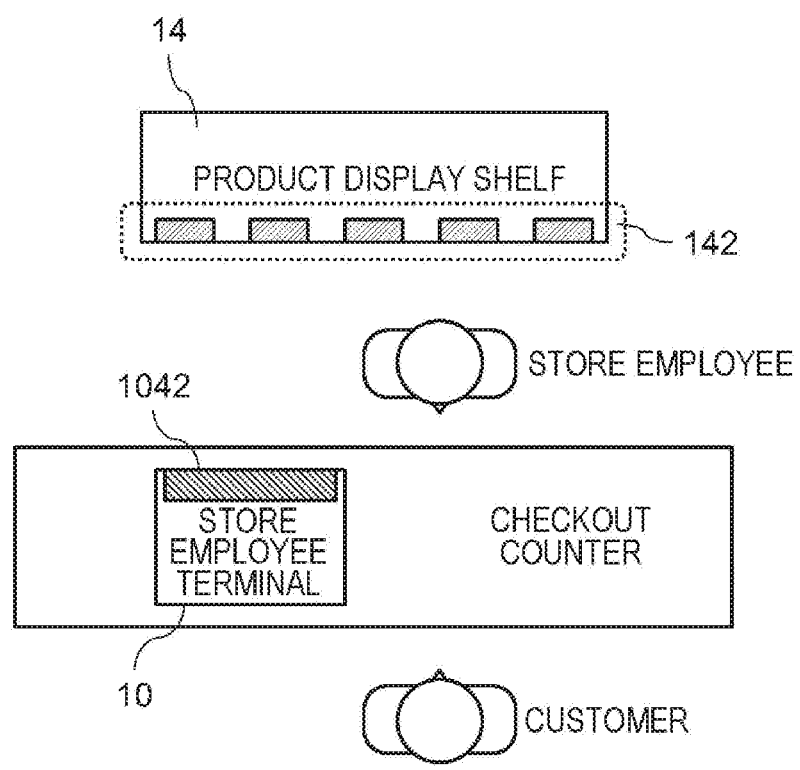
FIG. 8 is a diagram illustrating an example of an arrangement of elements constituting the sales operations assistance system in the third example embodiment.

FIG. 8 is a diagram illustrating an example of an arrangement of elements constituting the sales operations assistance system 1 in the third example embodiment. In the drawing, a store when viewed from above is illustrated. In the example in the drawing, the store employee terminal 10 is placed on the checkout counter. Although not illustrated in the example in the drawing, the store employee terminal 10 further includes a scanning apparatus for use in product recognition, a cash register, a drawer, and an automatic change dispenser. In this case, the store employee terminal 10 can be said to be a product registration terminal that performs registration processing of a product that a customer purchases. The product display shelf 14 is arranged in a store employee-only area, which is located behind the checkout counter when viewed from the customer side. The product display shelf 14 includes a light emitting apparatus 142 for each product.

Figure 9:
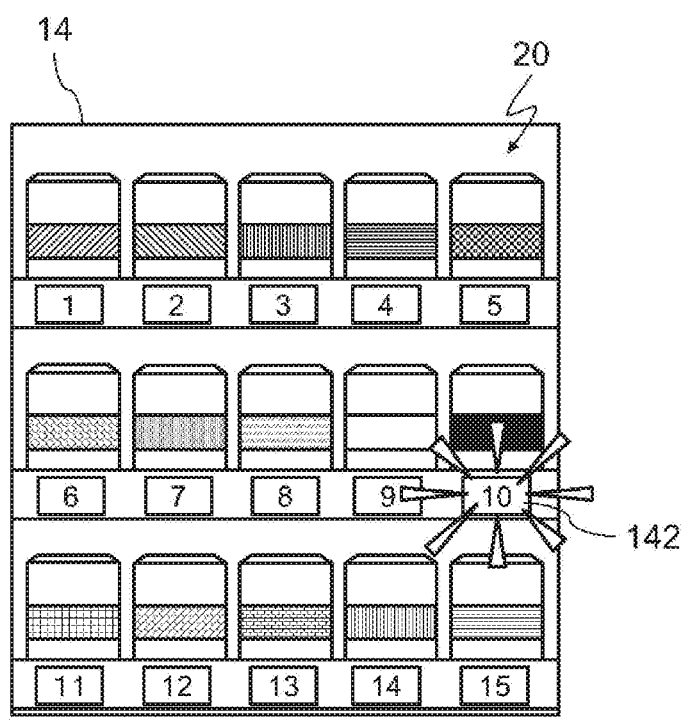
FIG. 9 is a diagram illustrating a product display shelf when viewed from the front.

A specific example of the product display shelf 14 will be described using FIG. 9. FIG. 9 is a diagram illustrating the product display shelves 14 when viewed from the front. In the product display shelves 14, various types of products 20 are displayed. Although not particularly limited, a product 20 is a product, such as a cigarette and hot snack food, that is picked by a store employee and handed to a customer. It should be noted that, in FIG. 9, a situation in which a cigarette is displayed in the product display shelves 14 is illustrated. With regard to luxury items, such as a cigarette, each customer almost always has a taste for a particular brand. Thus, luxury items, such as a cigarette, are well suited for the sales operations assistance system 1 of the application concerned.

Figure 10:
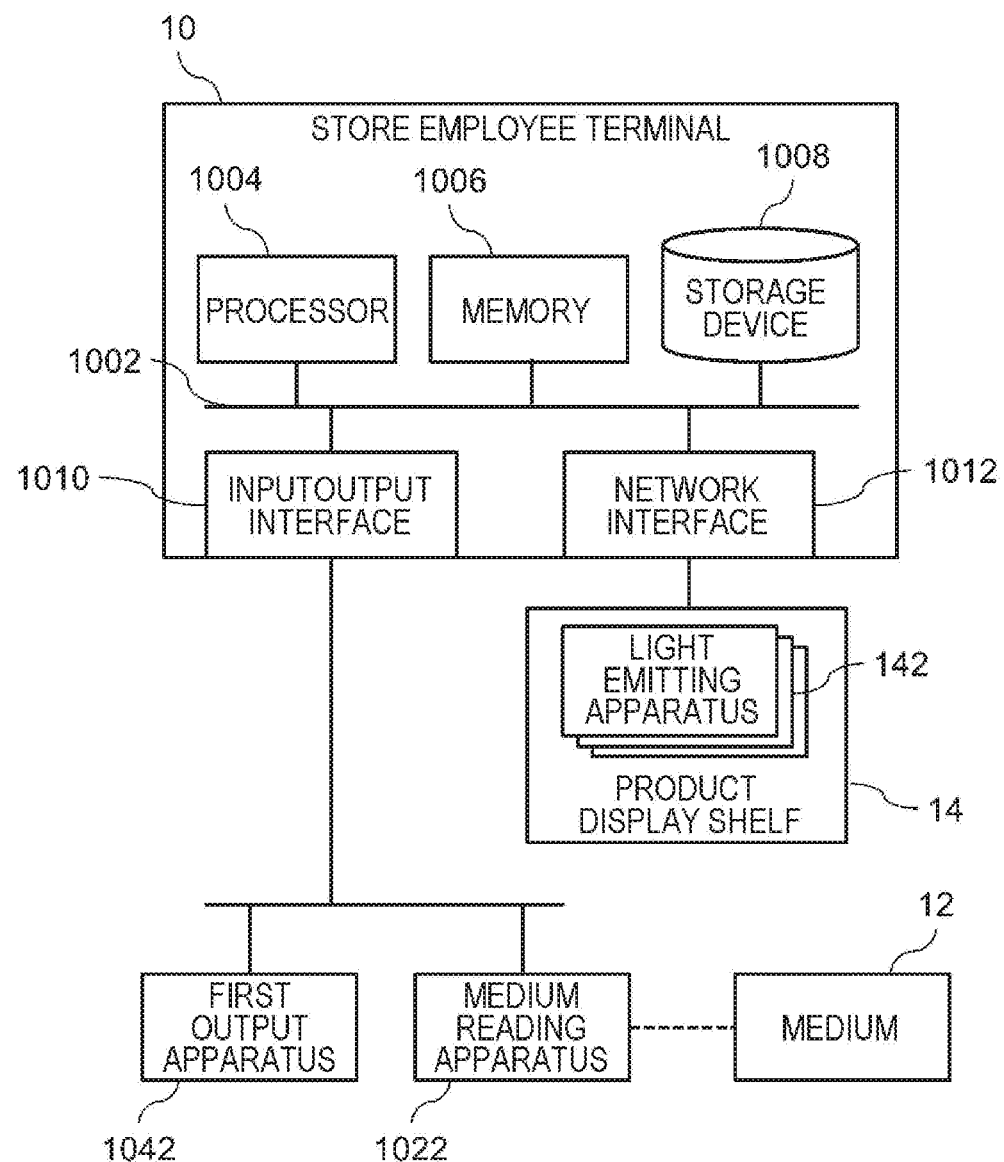
FIG. 10 is a block diagram conceptually illustrating a hardware configuration of the sales operations assistance system of the third example embodiment.

In FIG. 9, a case where a light emitting apparatus 142 corresponding to a product 20 displayed at the location numbered 10 emits light in accordance with an instruction from the notification unit 104 is illustrated. As illustrated in the example in the drawing, it becomes possible for a store employee to easily recognize the display place of a target product by means of light emission by a light emitting apparatus 142. Although not illustrated, the notification unit 104 may additionally (or alternatively) output a map illustrating the display location of a target cigarette in the product display shelves 14, the number (for example, No. 10) assigned to the cigarette, or the like to the first output apparatus 1042.
(Hardware Configuration)
FIG. 10 is a block diagram conceptually illustrating a hardware configuration of the sales operations assistance system 1 of the third example embodiment. In the present example embodiment, the store employee terminal 10 is connected to the product display shelf 14 or the light emitting apparatuses 142 in a communicable manner via a network interface 1012. A storage device 1008 of the present example embodiment further includes program modules for achieving the above-described functions of the notification unit 104. A processor 1004 reading and executing the program modules in a memory 1006 causes the above-described functions of the notification unit 104 to be achieved.

Operation Example

Figure 11:
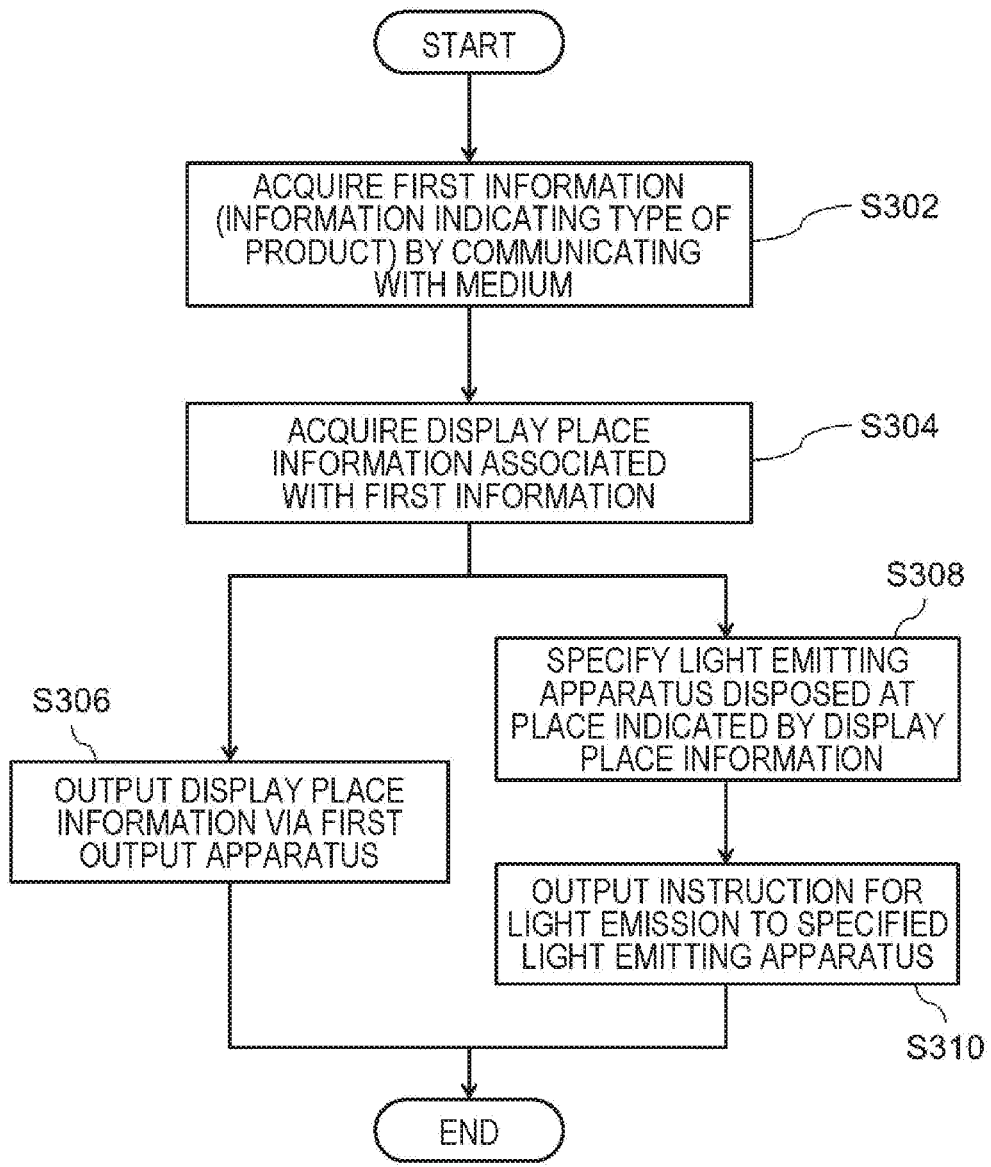
FIG. 11 is a flowchart illustrating a processing flow in the sales operations assistance system according to the third example embodiment.

Using FIG. 11, a processing flow of the sales operations assistance system 1 of the present example embodiment will be described. FIG. 11 is a flowchart illustrating a processing flow in the sales operations assistance system 1 according to the third example embodiment.

First, a communication unit 102 acquires first information (information indicating a type of a product) stored in the storage area of a medium 12 (S302). This processing is the same as the processing in S102 in FIG. 3.

Subsequently, the notification unit 104, using the first information stored in the memory 1006 or the like by the communication unit 102, acquires display place information indicating a display place of the product (S304). As an example, the display place information is stored in the storage device 1008 in association with the first information stored in the medium 12. In this case, the notification unit 104 is capable of reading the display place information, which is associated with the first information acquired in the processing in S302, from the storage device 1008.

Subsequently, the notification unit 104 notifies a store employee of the display place information acquired in the processing in S304 via the first output apparatus 1042 (S306). As an example, when the first output apparatus 1042 is a display installed for use by store employees, the notification unit 104 generates drawing data of a screen including the display place information acquired in the processing in S304 and outputs the drawing data to the display. In this case, the display installed as the first output apparatus 1042 displays a screen including the display place information, based on the drawing data acquired from the notification unit 104. The store employee is able to know the display place of the product corresponding to the medium 12 by checking displayed contents on the display. As another example, when the first output apparatus 1042 is a speaker apparatus installed for use by store employees, the notification unit 104 converts the display place information acquired in the processing in S304 to voice data, using, for example, a known voice synthesis technology and outputs the voice data to the speaker apparatus. The speaker apparatus reproduces a voice conveying the display place of the product, based on the voice data acquired from the notification unit 104. The store employee is able to know the display place of the product corresponding to the medium 12, based on the voice reproduced from the speaker apparatus.

The notification unit 104 may notify the store employee of the display place information acquired in the processing in S304 via a light emitting apparatus 142. This processing is performed in addition to (or in place of) the processing in S306. First, the notification unit 104 specifies a light emitting apparatus 142 disposed at a location indicated by the display place information (S308). In this case, as an example, the storage device 1008 stores information on the light emitting apparatuses 142 (for example, address information of the light emitting apparatuses 142) and display place information in association with each other. The notification unit 104 acquires, based on the display place information acquired in the processing in S304, information on the light emitting apparatus 142 corresponding to the display place information. In this way, a target light emitting apparatus 142 is specified from among the plurality of light emitting apparatuses 142 disposed in the product display shelf 14. The notification unit 104 outputs an instruction for light emission to the specified light emitting apparatus 142 (S310). The notification unit 104 is capable of, using information on the target light emitting apparatus 142, which was acquired in S308, transmitting an instruction for light emission to the light emitting apparatus 142. The light emitting apparatus 142 specified in the processing in S308 starts a light-emitting action (lighting or blinking) in response to the instruction for light emission from the notification unit 104 (for example, FIG. 9).

In the present example embodiment that has been described thus far, when a customer purchases a product in the product display shelf 14 that is often seen in a retail store or the like and is installed in an operation area of a store employee, a location in the product display shelf 14 where the product is located is notified to the store employee by means of a light-emitting action of a light emitting apparatus 142. This configuration enables an operation period required for a store employee to provide a product in the product display shelf 14 to a customer to be reduced. The reduction in the period required to provide a customer with a product causes convenience for customers to be improved.

Fourth Example Embodiment

The present example embodiment differs from the above-described example embodiments in including a mechanism in which a product different from a product corresponding to first information stored in a medium 12 is recommended to a customer.
(System Configuration)

Figure 12:
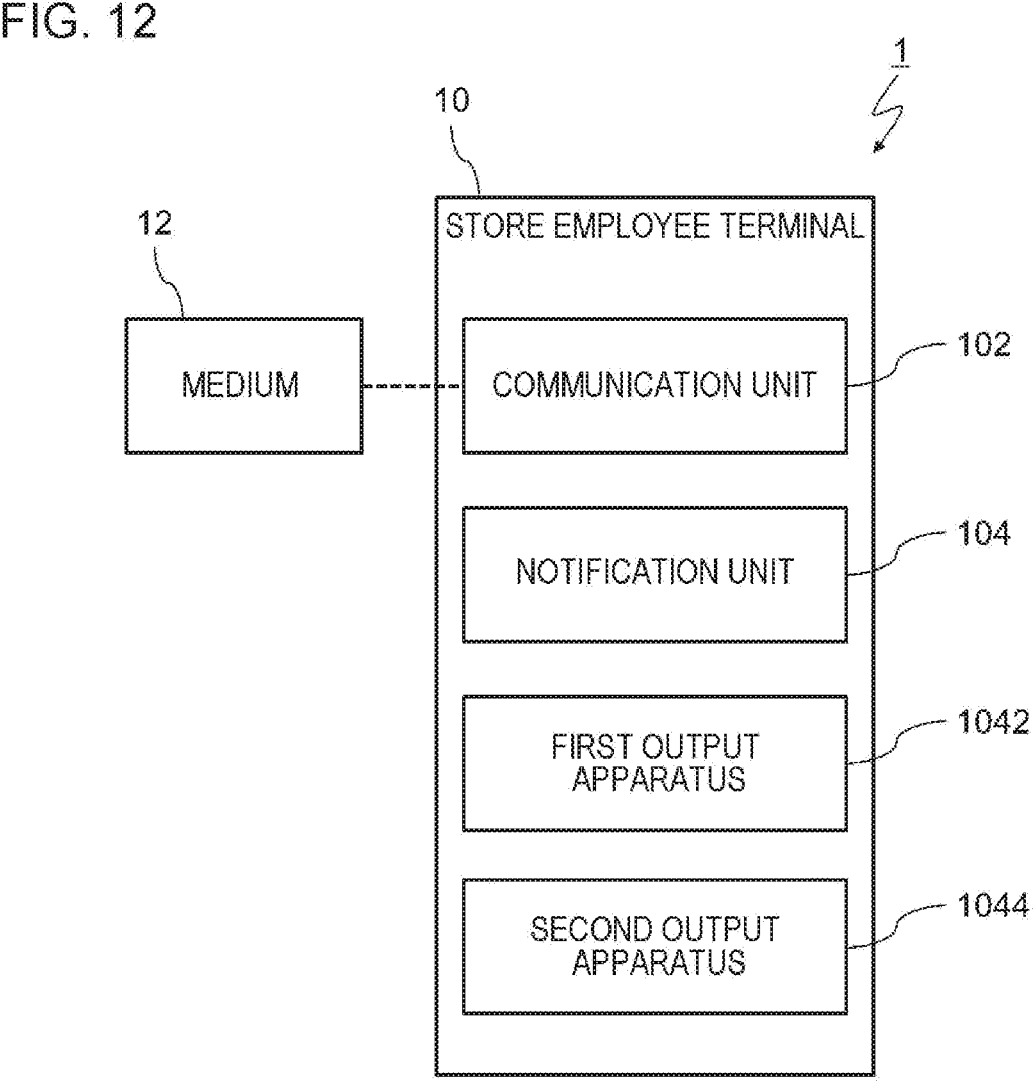
FIG. 12 is a diagram conceptually illustrating a configuration of a sales operations assistance system according to a fourth example embodiment.

FIG. 12 is a diagram conceptually illustrating a configuration of a sales operations assistance system 1 according to a fourth example embodiment. As illustrated in FIG. 12, in the present example embodiment, a store employee terminal 10 in the sales operations assistance system 1 further include a second output apparatus 1044. It should be noted that, in FIG. 12, an example in which the sales operations assistance system 1 is configured based on the configuration of the first example embodiment is illustrated. The sales operations assistance system 1 of the present example embodiment may further include the configurations described in the second and third example embodiments.

The second output apparatus 1044 is an apparatus for outputting information for a customer. In the present example embodiment, second information of a product further includes information on another product (related product) related to the product. A related product is, for example, determined by the store side in advance with respect to each product. A notification unit 104 of the present example embodiment acquires, based on first information stored in a medium 12, information on a related product. The notification unit 104 outputs the acquired information on the related product to the second output apparatus 1044. The second output apparatus 1044 notifies a customer of the information on the related product, which was acquired from the notification unit 104.
(Hardware Configuration)

Figure 13:
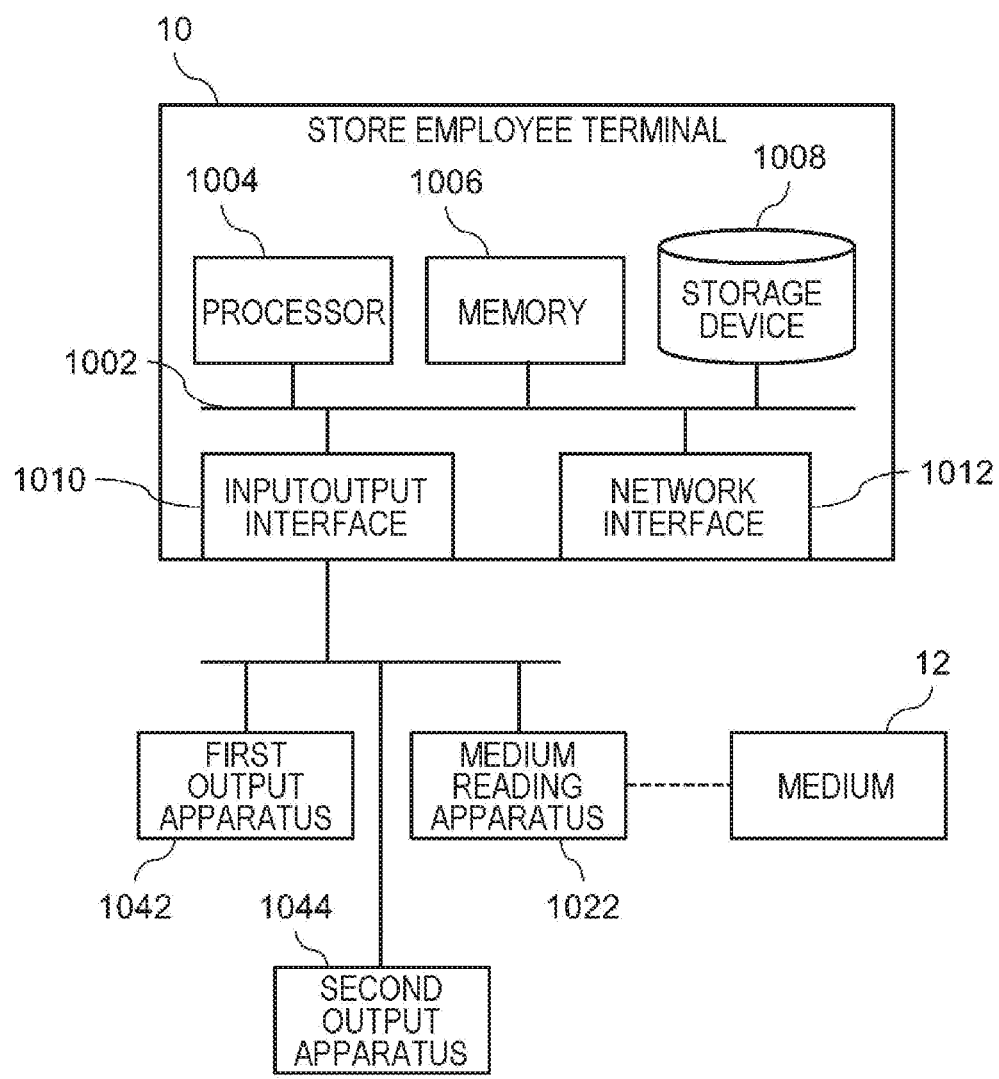
FIG. 13 is a block diagram conceptually illustrating a hardware configuration of the sales operations assistance system of the fourth example embodiment.

FIG. 13 is a block diagram conceptually illustrating a hardware configuration of the sales operations assistance system 1 of the fourth example embodiment. In the present example embodiment, to an input/output interface 1010 of the store employee terminal 10, the second output apparatus 1044 is further connected. The second output apparatus 1044 is an apparatus, such as a display and a speaker, that outputs information to a customer. A storage device 1008 of the present example embodiment further includes program modules for achieving the above-described functions of the notification unit 104. A processor 1004 reading and executing the program modules in a memory 1006 causes the above-described functions of the notification unit 104 to be achieved.

Operation Example

Figure 14:
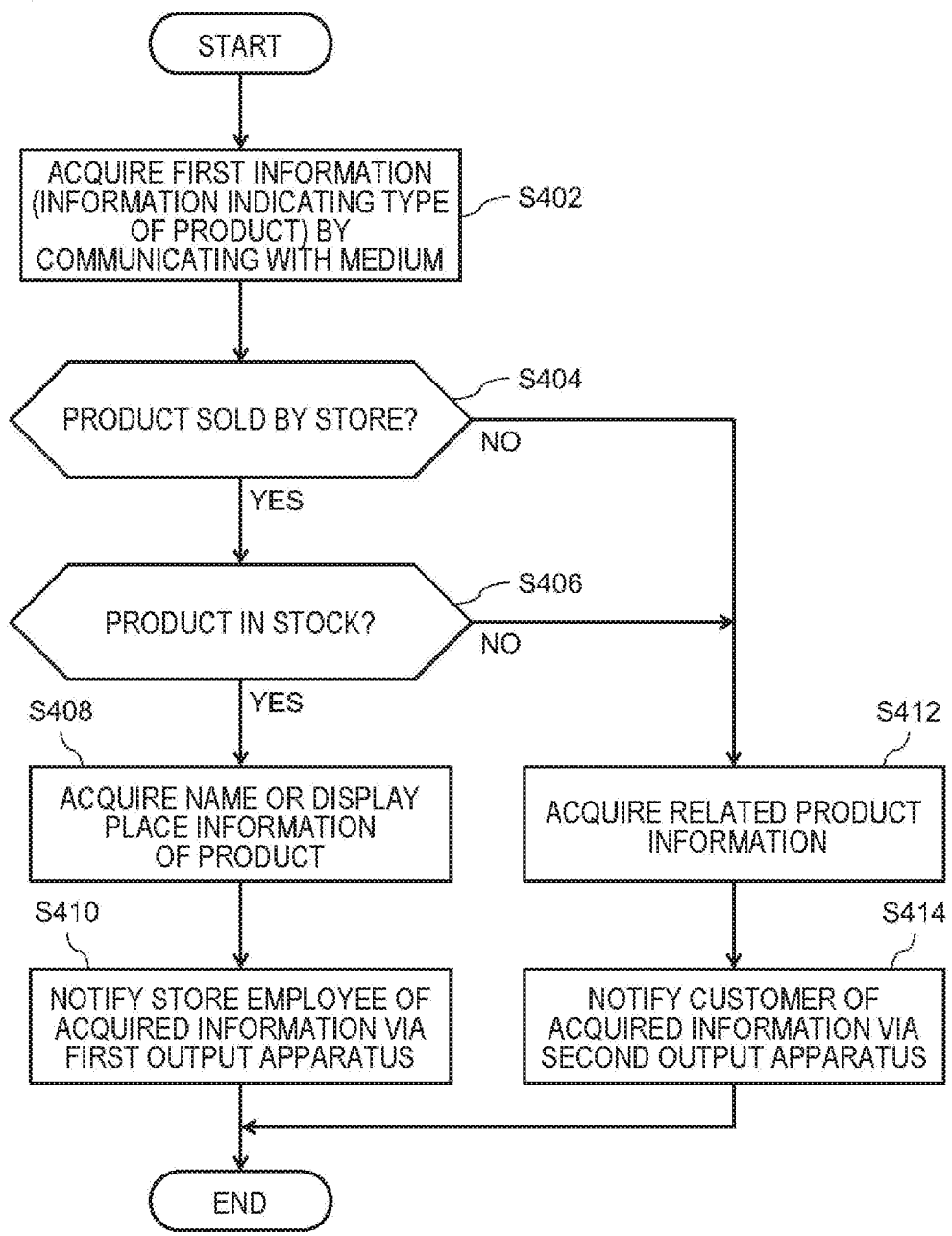
FIG. 14 is a flowchart illustrating a processing flow in the sales operations assistance system according to the fourth example embodiment.
Figure 15:
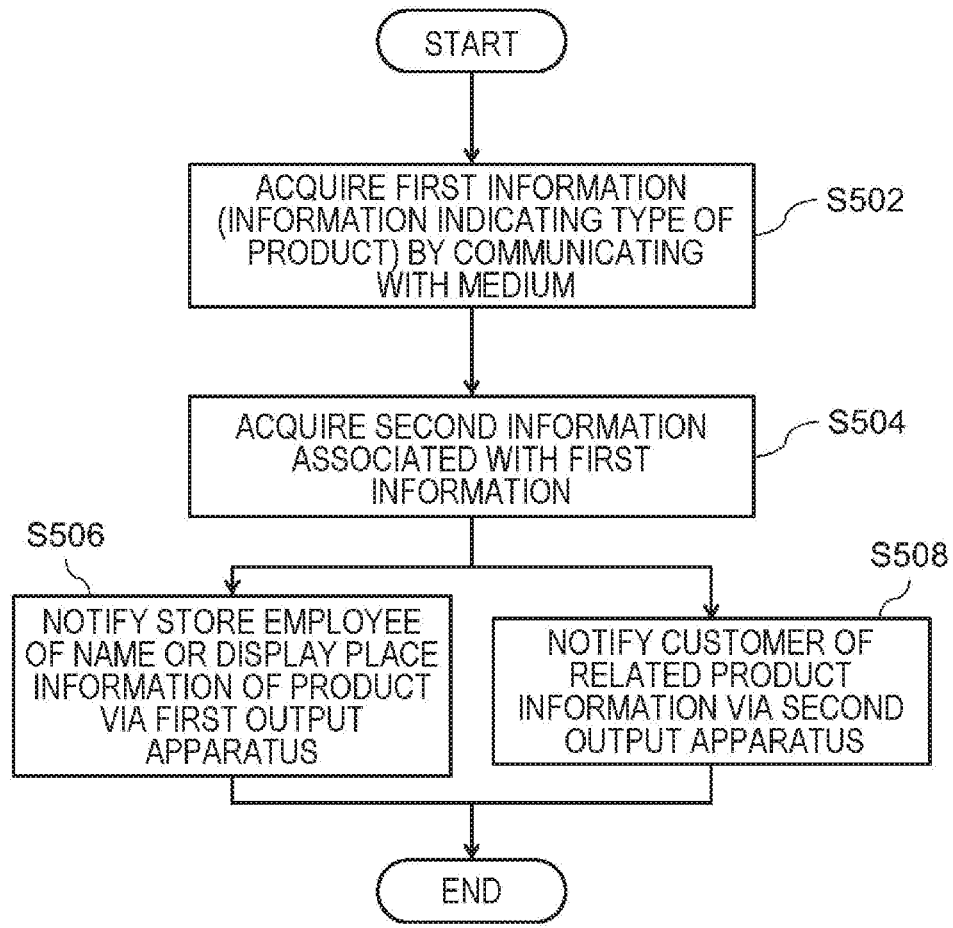
FIG. 15 is a flowchart illustrating another processing flow in the sales operations assistance system according to the fourth example embodiment.

Using FIGS. 14 and 15, a processing flow of the sales operations assistance system 1 of the present example embodiment will be described. FIGS. 14 and 15 are flowcharts illustrating processing flows in the sales operations assistance system 1 according to the fourth example embodiment.

First, the processing flow illustrated in FIG. 14 will be described. In FIG. 14, a processing flow in which, when a product is not sold by a store or the product is out of stock in the store, related product information is notified to a customer is illustrated.

First, a communication unit 102 acquires first information (information indicating a type of a product) stored in the storage area of a medium 12 (S402). This processing is the same as the processing in S102 in FIG. 3.

The notification unit 104 determines whether a product specified by the first information acquired in the processing in S402 is a product that is sold by the store (S404). As an example, the notification unit 104 is capable of, referring to product master data that store various types of information on products sold by the store, determining whether the product specified by the first information stored in the medium 12 is sold by the store.

When the product specified by the first information acquired in the processing in S402 is a product sold by the store (YES in S404), the notification unit 104 further determines whether the product is in stock (S406). Information indicating in-stock statuses of products is stored in, for example, a store server (not illustrated) that is connected to the store employee terminal 10 in a communicable manner.

When the product specified by the first information acquired in the processing in S402 is in stock (YES in S406), the notification unit 104 acquires information to be notified to the store employee from second information associated with the first information. For example, the notification unit 104 acquires information indicating the name of the product or a display place of the product (S408). The notification unit 104 notifies the store employee of the acquired information via a first output apparatus 1042 (S410). The processing is the same as the processing flow described in the above-described example embodiments.

When the product specified by the first information acquired in the processing in S402 is not a product sold in the store (NO in S404) or the product specified by the first information acquired in the processing in S402 is out of stock (NO in S406), the notification unit 104 operates as follows. First, the notification unit 104 acquires information to be notified to the customer from the second information associated with the first information. Specifically, the notification unit 104 acquires related product information of the product corresponding to the first information acquired in the processing in S402 (S412). The notification unit 104 notifies the customer of the acquired information via the second output apparatus 1044 (S414). When a product that the customer desires to purchase is out of stock, notifying the customer of information of a related product that the customer may purchase in place of the product enables an effect of preventing product sales opportunities from being lost to be expected.

Next, the processing flow illustrated in FIG. 15 will be described. In FIG. 15, a processing flow in which, when first information is read from a medium 12, related product information is notified to a customer without exception is illustrated.

First, the communication unit 102 acquires first information (information indicating a type of a product) stored in the storage area of a medium 12 (S502). The notification unit 104 acquires, based on the first information acquired by the communication unit 102, second information (additional information of the product corresponding to the medium 12) (S504). This processing is the same as the processing in S102 and the processing in S104 in FIG. 3.

The notification unit 104 acquires information to be notified to a store employee from the second information of the product acquired in the processing in S504. For example, the notification unit 104 acquires information indicating the name or a display place of the product. The notification unit 104 notifies the store employee of the acquired information via the first output apparatus 1042 (S506). This processing is the same as the processing in S408 and S410 in FIG. 14.

The notification unit 104 acquires information to be notified to the customer from the second information of the product acquired in the processing in S504. Specifically, the notification unit 104 acquires related product information of the product corresponding to the first information acquired in the processing in S502. The notification unit 104 notifies the customer of the acquired information via the second output apparatus 1044 (S508). This processing is the same as the processing in S412 and S414 in FIG. 14.

As described above, by notifying a customer of related product information without exception when first information is read from a medium 12, it is possible to induce the customer to purchase, at the same time, a related product of a product that the customer is to purchase.

Variations of Fourth Example Embodiment

In the present example embodiment, the notification unit 104 may output related product information to, in place of the output apparatus on the customer side (the second output apparatus 1044), the output apparatus on the store employee side (the first output apparatus 1042). In the present example embodiment, the notification unit 104 may also output related product information to both the output apparatus on the store employee side (the first output apparatus 1044) and the output apparatus on the customer side (the second output apparatus 1042). The store employee can, by referring to information of a related product output to the first output apparatus 1042, provide information of a product suited for a person being served. In other words, the store employee can provide the customer with customer service of higher quality. Because of this configuration, an effect of increasing the possibility that a customer purchases a related product can be expected.

While the example embodiments of the disclosure have been described above with reference to the drawings, the example embodiments are only exemplification of the disclosure and various configurations other than the above-described example embodiments can also be employed.

Although, in a plurality of flowcharts used in the above description, a plurality of steps (processing) are described in sequence, the execution sequence of the steps executed in the example embodiments is not limited to the description sequence. In the example embodiments, the sequence of the illustrated steps may be modified within a range not adversely affecting the results. The above-described example embodiments can be combined with each other within a range in which the contents do not conflict with each other.

The whole or part of the example embodiments disclosed above can be described as, but not limited to, the following supplementary notes.

1. A sales operations assistance system including:
   a medium that has a storage area that stores first information that indicates a type of a product; and a store employee terminal that a store employee operates,
in which the store employee terminal includes
a communication unit that reads, by communicating with the medium, the first information stored in the storage area, and
a notification unit that acquires second information of the product, using the first information read by the communication unit and outputs the second information to a first output apparatus for use by the store employee.
2. The sales operations assistance system according to supplementary note 1,
in which the store employee terminal further includes
a writing unit that writes the first information in the storage area when the medium is provided to a customer.
3. The sales operations assistance system according to supplementary note 2,
in which the first information written in the storage area by the writing unit cannot be rewritten.
4. The sales operations assistance system according to any one of supplementary notes 1 to 3,
in which the second information includes information indicating a display place of the product, and
the notification unit outputs the display place of the product to the first output apparatus.
5. The sales operations assistance system according to supplementary note 4,
in which the first output apparatus is a light emitting apparatus disposed with respect to each product in a product display shelf installed in a store employee-only area, and
the notification unit causes, among light emitting apparatuses each of which is disposed with respect to each product, the light emitting apparatus corresponding to the display place of the product to emit light, the display place being indicated by the second information.
6. The sales operations assistance system according to any one of supplementary notes 1 to 5,
in which the second information further includes information on a related product of the product, and
the notification unit outputs the information on the related product to a second output apparatus for use by a customer.
7. The sales operations assistance system according to any one of supplementary notes 1 to 6,
in which the store employee terminal is a product registration terminal that registers a product that a customer purchases.
8. The sales operations assistance system according to any one of supplementary notes 1 to 7,
in which the product is a cigarette.
9. A sales operations assistance method performed by a computer, the method including
by communicating with a medium having a storage area that stores first information indicating a type of a product, reading the first information stored in the storage area, and
acquiring second information of the product, using the read first information, and outputting the second information to a first output apparatus for use by a store employee.
10. The sales operations assistance method performed by the computer according to supplementary note 9, the method further including
when the medium is provided to a customer, writing the first information in the storage area.
11. The sales operations assistance method according to supplementary note 10,
in which the first information written in the storage area cannot be rewritten.
12. The sales operations assistance method performed by the computer according to any one of supplementary notes 9 to 11,
in which the second information includes information indicating a display place of the product,
the method further including outputting the display place of the product to the first output apparatus.
13. The sales operations assistance method performed by the compute according to supplementary note 12,
in which the first output apparatus is a light emitting apparatus disposed with respect to each product in a product display shelf installed in a store employee-only area,
the method further including causing, among light emitting apparatuses each of which is disposed with respect to each product, the light emitting apparatus corresponding to the display place of the product to emit light, the display place being indicated by the second information.
14. The sales operations assistance method performed by the computer according to any one of supplementary notes 9 to 13,
in which the second information further includes information on a related product of the product,
the method further including outputting the information on the related product to a second output apparatus for use by a customer.
15. The sales operations assistance method according to any one of supplementary notes 9 to 14,
in which the computer is a product registration terminal that registers a product that a customer purchases.
16. The sales operations assistance method according to any one of supplementary notes 9 to 15,
in which the product is a cigarette.
17. A program causing a computer to execute a sales operations assistance method according to any one of supplementary notes 9 to 16.

This application is based upon and claims the benefit of priority from Japanese Patent Application No. 2018-000611, filed on Jan. 5, 2018, the disclosure of which is incorporated herein in its entirety by reference.

What is claimed is:
1. A device comprising:
at least one hardware processor configured to implement:
a communication unit that obtains information from a medium of a customer of a store, and
a notification unit that, based on the information, controls an output of light by a light emitting apparatus attached to a shelf at which a product is located in the store,
wherein the medium of the customer has an identification surface including an identification information for the product,
wherein the communication unit obtains the information by reading the identification information from the identification surface of the medium of the customer,
wherein the light emitting apparatus is separate from a store employee terminal and is installed at a checkout counter area of a store employee-only area,
wherein a case that the customer purchases the product from the store comprises an employee in the store employee-only area picking up the product from the store employee-only area and handing the product from the store employee-only area to the customer, and wherein the communication unit is configured to obtain the information from the medium by scanning the medium.

2. The device according to claim 1, wherein the at least one hardware processor is further configured to implement a writing unit that writes the information into the medium.

3. The device according to claim 2, wherein the information is about only one type of product, the writing unit further writes, into the medium, the information along with flag information indicating that the information cannot be rewritten subsequently, and the writing unit further confirms a presence or an absence of the flag information before writing the information into the medium, and writes the information in the medium when the absence of the flag information is confirmed.

4. The device according to claim 1, wherein the light emitting apparatus is installed in the store employee-only area and among a plurality of other light emitting apparatuses that are also installed in the store employee-only area, and the at least one hardware processor is further configured to, based on the information, determine, among the plurality of other light emitting apparatuses, the light emitting apparatus of which the notification unit controls the output of light based on the information.

5. The device according to claim 4, wherein the store employee-only area comprises the store employee terminal configured to register the product at least in a case that the customer purchases the product from the store.

6. The device according to claim 1, wherein the at least one hardware processor is further configured to determine, based on the information, a related product of the product, and the notification unit further controls an output of an indication about the related product.

7. The device according to claim 1, wherein the product is a cigarette.

8. The device according to claim 1, wherein the product is located on the shelf and the light emitting apparatus is arranged directly on an outermost edge of the shelf.

9. The device according to claim 1, wherein other products are located on the shelf, and wherein the at least one hardware processor is further configured to implement controlling the output of light by the light emitting apparatus such the output of light is respective to the product.

10. The device according to claim 1, wherein the light emitting apparatus is installed in a store employee-only area which comprises the device which is the store employee terminal configured to register the product for a future purchase by the customer.

11. The device according to claim 1, wherein the identification information, from the identification surface of the medium of the customer, comprises an image of the product, and wherein the communication unit obtains the information by image recognition of the image of the product.

12. A method performed by a computer, the method comprising:

obtaining information from a medium of a customer of a store; and based on the information, controlling an output of light by a light emitting apparatus attached to a shelf at which a product is located in the store, wherein the medium of the customer has an identification surface including an identification information for the product, wherein controlling the output of the light is based on obtaining the information by reading the identification information from the identification surface of the medium of the customer, wherein the light emitting apparatus is separate from a store employee terminal and is installed at a checkout counter area of a store employee-only area, wherein a case that the customer purchases the product from the store comprises an employee in the store employee-only area picking up the product from the store employee-only area and handing the product from the store employee-only area to the customer, and wherein the communication unit is configured to obtain the information from the medium by scanning the medium.

13. The method performed by the computer according to claim 12, the method further comprising:

writing the information into the medium.

14. The method according to claim 13, wherein the method further comprises:

writing, into the medium, the information along with flag information indicating that the information cannot be rewritten subsequently; and confirming a presence or an absence of the flag information in the medium before writing the information into the medium of the customer and writing the first information in the medium when an absence of the flag information in the storage area is confirmed, and wherein the information is about only one type of product.

15. The method performed by the computer according to claim 12, wherein the light emitting apparatus is installed in a store employee-only area and among a plurality of other light emitting apparatuses that are also installed in the store employee-only area, and the method further comprising determining, based on the information and among the plurality of other light emitting apparatuses, the light emitting apparatus of which the notification unit controls the output of light based on the information.

16. The method according to claim 15, wherein the store employee-only area comprises the store employee terminal configured to register the product at least in a case that the customer purchases the product from the store.

17. The method performed by the computer according to claim 12, the method further comprising:

determining, based on the information, a related product of the product, controlling an output of an indication about the related product.

18. The method according to claim 12, wherein the product is a cigarette.

19. A computer readable medium storing a program causing a computer to execute a method, the method comprising:

obtaining information from a medium of a customer of a store; and controlling an output of light by a light emitting apparatus attached to a shelf at which a product is located in the store, wherein the medium of the customer has an identification surface including an identification information for the product, wherein controlling the output of the light is based on obtaining the information by reading the identification information from the identification surface of the medium of the customer, wherein the light emitting apparatus is separate from a store employee terminal and is installed at a checkout counter area of a store employee-only area, wherein a case that the customer purchases the product from the store comprises an employee in the store employee-only area picking up the product from the store employee-only area and handing the product from the store employee-only area to the customer, and wherein the communication unit is configured to obtain the information from the medium by scanning the medium.

\* \* \* \* \*